(12) United States Patent
Tanimoto

(10) Patent No.: US 8,005,893 B2
(45) Date of Patent: *Aug. 23, 2011

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 406 days.

This patent is subject to a terminal disclaimer.

(21) Appl. No.: 12/112,127

(22) Filed: Apr. 30, 2008

(65) Prior Publication Data

US 2008/0275953 A1 Nov. 6, 2008

(30) Foreign Application Priority Data

May 2, 2007 (JP) .................................. 2007-121877
Jun. 7, 2007 (JP) .................................. 2007-152119

(51) Int. Cl.
*G06F 15/16* (2006.01)
*G06F 15/173* (2006.01)

(52) U.S. Cl. ........ 709/203; 709/206; 709/217; 709/225; 709/229; 709/230; 709/238; 709/246; 709/226

(58) Field of Classification Search .................. 709/203, 709/206, 217, 225, 229, 230, 238, 246; 370/352, 370/389, 401
See application file for complete search history.

(56) References Cited

U.S. PATENT DOCUMENTS

| | | | |
|---|---|---|---|
| 6,650,631 B1 * | 11/2003 | Benash et al. ................. | 370/352 |
| 6,898,641 B1 | 5/2005 | Kobayashi | |
| 6,988,199 B2 | 1/2006 | Toh et al. | |
| 7,139,811 B2 | 11/2006 | Lev Ran et al. | |
| 7,174,378 B2 | 2/2007 | Yoon et al. | |
| 7,206,088 B2 | 4/2007 | Tanimoto | |
| 7,257,638 B2 | 8/2007 | Celik et al. | |
| 7,412,489 B2 * | 8/2008 | Nowacki et al. ............... | 709/206 |
| 7,574,523 B2 * | 8/2009 | Traversat et al. .............. | 709/238 |
| 7,701,954 B2 * | 4/2010 | Rabenko et al. ............... | 370/401 |
| 7,774,495 B2 * | 8/2010 | Pabla et al. .................... | 709/238 |
| 2001/0047414 A1 | 11/2001 | Yoon et al. | |
| 2002/0056003 A1 | 5/2002 | Goswami | |
| 2002/0095506 A1 | 7/2002 | Tanimoto | |
| 2002/0143855 A1 * | 10/2002 | Traversat et al. .............. | 709/202 |

(Continued)

FOREIGN PATENT DOCUMENTS

JP 04-105143 A 4/1992

(Continued)

OTHER PUBLICATIONS

Tanimoto: "Relay Server and Relay Communication System," U.S. Appl. No. 12/335,642, filed Dec. 16, 2008.

(Continued)

*Primary Examiner* — Asad M Nawaz
*Assistant Examiner* — Vitali Korobov
(74) *Attorney, Agent, or Firm* — Keating & Bennett, LLP

(57) ABSTRACT

A relay server stores registered terminal information and information about the relay servers that form a relay group permitting connection among each other, about a shared resource, about terminals sharing the resource, and about a message to be transmitted in association with the resource. When an operation instruction regarding the resource held by another terminal is received from the registered terminal to which the relay server is connected, the relay server relays the operation instruction to another relay server. When the message is transmitted to the other terminal by the terminal, message information is relayed.

12 Claims, 15 Drawing Sheets

U.S. PATENT DOCUMENTS

| | | | |
|---|---|---|---|
| 2002/0143960 | A1 | 10/2002 | Goren et al. |
| 2002/0146002 | A1 | 10/2002 | Sato |
| 2002/0152299 | A1* | 10/2002 | Traversat et al. ............ 709/223 |
| 2003/0055741 | A1 | 3/2003 | Yamamoto |
| 2004/0083385 | A1 | 4/2004 | Ahmed et al. |
| 2004/0148432 | A1 | 7/2004 | Udono et al. |
| 2004/0162871 | A1* | 8/2004 | Pabla et al. .................. 709/201 |
| 2004/0255048 | A1 | 12/2004 | Lev Ran et al. |
| 2005/0076098 | A1 | 4/2005 | Matsubara et al. |
| 2005/0256909 | A1 | 11/2005 | Aboulhosn et al. |
| 2006/0020695 | A1 | 1/2006 | Tantek et al. |
| 2006/0083171 | A1 | 4/2006 | Tanaike et al. |
| 2006/0256771 | A1 | 11/2006 | Yarlagadda |
| 2006/0282540 | A1 | 12/2006 | Tanimoto |
| 2007/0022477 | A1 | 1/2007 | Larson |
| 2007/0214281 | A1 | 9/2007 | Celik et al. |
| 2007/0233844 | A1 | 10/2007 | Tanimoto |
| 2008/0089349 | A1 | 4/2008 | Tanimoto |
| 2008/0098088 | A1 | 4/2008 | Tamano et al. |
| 2008/0288591 | A1 | 11/2008 | Tanimoto |

FOREIGN PATENT DOCUMENTS

| | | | |
|---|---|---|---|
| JP | 2001-155007 | A | 6/2001 |
| JP | 2001-292167 | A | 10/2001 |
| JP | 2002-007182 | A | 1/2002 |
| JP | 2002-199150 | A | 7/2002 |
| JP | 2002-217938 | A | 8/2002 |
| JP | 2002-217943 | A | 8/2002 |
| JP | 2002-288415 | A | 10/2002 |
| JP | 2002-314573 | A | 10/2002 |
| JP | 2002-342144 | A | 11/2002 |
| JP | 2003-032310 | A | 1/2003 |
| JP | 2003-059792 | A | 2/2003 |
| JP | 2004-201255 | A | 7/2004 |
| JP | 2004-310371 | A | 11/2004 |
| JP | 2004-341849 | A | 12/2004 |
| JP | 2005-027040 | A | 1/2005 |
| JP | 2005-038104 | A | 2/2005 |
| JP | 2005-115943 | A | 4/2005 |
| JP | 2006-033105 | A | 2/2006 |
| JP | 2006-172192 | A | 6/2006 |
| JP | 2006-268138 | A | 10/2006 |
| JP | 2006-343943 | A | 12/2006 |
| JP | 2007-086910 | A | 4/2007 |
| JP | 2007-265135 | A | 10/2007 |
| JP | 2007-267136 | A | 10/2007 |
| JP | 2008-098699 | A | 4/2008 |
| JP | 2008-098888 | A | 4/2008 |
| JP | 2008-148125 | A | 6/2008 |
| JP | 2008-154101 | A | 7/2008 |
| JP | 2008-306500 | A | 12/2008 |
| JP | 2009-027652 | A | 2/2009 |
| JP | 2009-163300 | A | 7/2009 |
| JP | 2009-163302 | A | 7/2009 |
| JP | 2009-252159 | A | 10/2009 |
| JP | 2009-265919 | A | 11/2009 |
| WO | 2006/028850 | A2 | 3/2006 |

OTHER PUBLICATIONS

Tanimoto: "Relay Server and Relay Communication System," U.S. Appl. No. 12/335,661, filed Dec. 16, 2008.
Tanimoto: "Relay Server and Relay Communication System," U.S. Appl. No. 12/340,868, filed Dec. 22, 2008.
Shinji Okumura et al., SIP (session initiation protocol), Nikkei Communications, Sep. 22, 2003, pp. 150-158 (partial translation pp. 155-156 (Usable in IM and Presence Notification)).
Tanimoto, "Relay Server and Relay Communication System," U.S. Appl. No. 12/270,883, filed Nov. 14, 2008.
Official communication issued in counterpart Japanese Application No. 2007-152119, mailed on Mar. 5, 2009.
Official Communication issued in corresponding European Patent Application No. 08007228.3, mailed on Feb. 24, 2010.
Traversat et al., "Project JXTA 2.0 Super-Peer Virtual Network", http://research.sun.com/spotlight/misc/jxta.pdf, May 25, 2003, pp. 1-20.
Tanimoto: "Relay-Server," U.S. Appl. No. 11/853,943, filed Sep. 12, 2007.
Tanimoto: "File Server Device," U.S. Appl. No. 11/862,654, filed Sep. 27, 2007.
Tanimoto: "File Transfer Server," U.S. Appl. No. 11/870,622, filed Oct. 11, 2007.
Tanimoto: "Relay Server, Relay Communication System, and Communication Device," U.S. Appl. No. 11/944,495, filed Nov. 23, 2007.
Tanimoto: "Relay Server and Client Terminal," U.S. Appl. No. 11/953,351, filed Dec. 10, 2007.
Tanimoto: "Relay Server and Relay Communication System," U.S. Appl. No. 11/953,505, filed Dec. 10, 2007.
Tanimoto: "Relay Server and Relay Communication System," U.S. Appl. No. 12/103,933, filed Apr. 16, 2008.
Tanimoto: "Relay Server and Relay Communication System," U.S. Appl. No. 12/107,793, filed Apr. 23, 2008.
English translation of Official Communication issued in corresponding Japanese Patent Application No. 2006-334652, mailed on Jun. 8, 2010.
English translation of Official Communication issued in corresponding Japanese Patent Application No. 2007-152122, mailed on Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Official Communication issued in U.S. Appl. No. 11/723,466, mailed on Nov. 8, 2010.
Tanimoto; "Relay Device and Communication System"; U.S. Appl. No. 11/723,466, filed Mar. 20, 2007.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.

* cited by examiner

FIG. 6

```xml
<?xml version="1.0" encoding="Shift_JIS" ?>
<relay-policy policy-id="20061001150032@relay-server1" >
  <policy-info>
    <relay-account account="relay-server1@net" name="relay-server1" >
      <user-account account="user1A@relay-server1.net" name="terminal1A" group="0001" />
      <user-account account="user1B@relay-server1.net" name="terminal1B" group="0001" />
    </relay-account>
    <relay-account account="relay-server2@net" name="relay-server2" >
      <user-account account="user2A@relay-server2.net" name="terminal2A" group="0002" />
      <user-account account="user2B@relay-server2.net" name="terminal2B" group="0002" />
    </relay-account>
    <relay-account account="relay-server3@net" name="relay-server3" >
      <user-account account="user3A@relay-server3.net" name="terminal3A" group="0003" />
      <user-account account="user3B@relay-server3.net" name="terminal3B" group="0003" />
    </relay-account>
  </policy-info>
</relay-policy>
```

FIG. 7

```
<?xml version="1.0" encoding="Shift_JIS" ?>
<user-account account="user1A@relay-server1.net" >
 <policy name="projectA" policy-id="20061001150032user1A@relay-server1.net" >
  <family-account-info>
   <user-account account="user1A@relay-server1.net" />
   <user-account account="user2A@relay-server2.net" />
   <user-account account="user3A@relay-server3.net" />
  </family-account-info>
  <family-resource-info>
   <resource name="projectA-folder" owner="user1A@relay-server1.net"
        value="c:/folderA" status="ok" msg="msg:thread1" >
   <resource name="file00ZX.xls" owner="user1A@relay-server1.net"
        value="//network/z:/folderZ/file001.xls" status="ok" msg="msg:thread2" />
   <resource name="file00ZY.doc" owner="user1A@relay-server1.net"
        value="//network/z:/folderZ/file002.doc" status="ok" />
   </resource>
  </family-resource-info>
  <msg>
   <thread1>
    <message id="0001@user1A.relay-server1.net">
    ---MIME MESSAGE---
    </message>
   </thread1>
   <thread2>
    <message id="0002@user1A.relay-server1.net">
    ---MIME MESSAGE---
    </message>
    <message id="0003@user2A.relay-server1.net">
    ---MIME MESSAGE---
    </message>
   </thread2>
  </msg>
 </policy>
</user-account>
```

FIG. 8

```
Date: Mon, 02 Apr 2007 10:04:54 +0900
From: <user1A@relay-server1.net>
To: <user2A@relay-server2.net>, <user3A@relay-server3.net>
Subject: =?ISO-2022-JP?B?GyRCJVclbSU4JSclLyVIGyhCQRskQiR0GyhCd29ya3NwYWM=?=
 =?ISO-2022-JP?B?ZRskQjpuQC4bKEI=?=
Message-Id: <20070402100407.4C2A.user1A@relay-server1.net>
MIME-Version: 1.0
Content-Type: text/plain; charset="ISO-2022-JP"
Content-Transfer-Encoding: 7bit                                    ╲132

$B%W%m%8%' %/%H(BA$B$N3+H/%j%=-!<%9$r$3$3$G4lM}$7$^$9!#(B    ←──133
```
╲─131(131a)

```
Date: Mon, 02 Apr 2007 10:24:12 +0900
From: <user1A@relay-server1.net>
To: <user2A@relay-server2.net>, <user3A@relay-server3.net>
Subject: =?ISO-2022-JP?B?GyRCJTkIMSU4JWUhPCVrJVUIISUkJWsbKEI=?=
Message-Id: <20070402102248.4C2C.user1A@relay-server1.net>
MIME-Version: 1.0
Content-Type: text/plain; charset="ISO-2022-JP"
Content-Transfer-Encoding: 7bit                                   ╲132

$BBgF|Dx%W%i%s$rDl2C$7$^$7$?!#(B                                ←──133
$B3NG'2<$5$$!#(B
```
╲─131(131b)

```
Date: Mon, 02 Apr 2007 10:34:53 +0900
From: <user2A@relay-server1.net>
To: <user1A@relay-server2.net>, <user3A@relay-server3.net>
Subject: Re: =?ISO-2022-JP?B?GyRCJTkIMSU4JWUhPCVrJVUIISUkJWsbKEI=?=
In-Reply-To: <20070402102248.4C2C.user1A@relay-server1.net>
References: <20070402102248.4C2C.user1A@relay-server1.net>
Message-Id: <20070402102346.4C2F.user2A@relay-server1.net>
MIME-Version: 1.0
Content-Type: text/plain; charset="ISO-2022-JP"
Content-Transfer-Encoding: 7bit                                    ╲132

```xml
<?xml version="1.0" encoding="Shift_JIS" ?>
<user-account account="user1A@relay-server1.net" >
  <policy name="projectA" policy-id="20061001150032user1A@relay-server1.net" >
    <family-account-info>
      <user-account account="user1A@relay-server1.net" />
      <user-account account="user2A@relay-server2.net" />
      <user-account account="user3A@relay-server3.net" />
    </family-account-info>
    <family-resource-info  msg="msg:thread1">
      <resource name="projectA-folder" owner="user1A@relay-server1.net"
                value="c:/folderA" status="ok" >
        <resource name="file00ZX.xls" owner="user1A@relay-server1.net"
                  value="//network/z://folderZ/file001.xls" status="ok" />
        <resource name="file00ZY.doc" owner="user1A@relay-server1.net"
                  value="//network/z://folderZ/file002.doc" status="ok" />
      </resource>
    </family-resource-info>
    <msg>
      <thread1>
        <message id="0001@user1A.relay-server1.net">
          ----MIME MESSAGE----
        </message>
      </thread1>
    </msg>
  </policy>
</user-account>
```

RELAY SERVER AND RELAY COMMUNICATION SYSTEM

CROSS-REFERENCE TO RELATED APPLICATIONS

This application claims priority under 35 U.S.C. §119 to Japanese Patent Application No. 2007-121877 filed on May 2, 2007 and Japanese Patent Application No. 2007-152119 filed on Jun. 7, 2007, which applications are hereby incorporated by reference in its entirety.

BACKGROUND OF THE INVENTION

1. Field of the Invention

The present invention relates to a configuration of a relay server that enables communication between terminals.

2. Description of the Related Art

A communication technique referred to as a Virtual Private Network (VPN) is conventionally known. The VPN is used, for example, for communication over the Internet between terminals connected to a Local Area Network (LAN) of a plurality of branch offices (base points) established in separate regions. Through the use of the VPN, another LAN in a remote location can be used as if it is a directly connected network.

As a method for exchanging a file with a destination that is inside and/or outside the VPN, for example, a method for transmitting an electronic mail (e-mail) with a proper text message described therein and the file attached thereto is also known. It is also common to upload the file by using a File Transfer Protocol (FTP) service and to send by mail a recording medium such as a CD disk in which the file is recorded, or the similar medium.

However, when using the method for transmitting the file attached to the e-mail, the e-mail is managed in a mailbox, and it is necessary each time to organize and store the attached file in a desired folder. Moreover, when a file size is large, it is necessary to set a mail server, and to compress or divide the file due to limitations of mailbox sizes. Accordingly, a receiving side is required to perform a decompression process or a connecting process, and such operations have been troublesome.

When using the FTP service, although the service is suitable for the transmission of large files, troublesome operations such as setting up an account for the FTP service have been necessary. Alternatively, when sending by mail the large file recorded in the recording medium such as the CD disk, the cost for such media and for mailing can be expensive, causing cost increase.

When using the FTP service, mailing method, or other similar method, if a message is desired to be transmitted along with the file, the message has to be transmitted separately via FTP service, e-mail, or other similar method, causing additional, troublesome work. Moreover, a party receiving the message and the file is required to manage the received file by using file managing software such as Explorer and to manage the message by using e-mail software. Therefore, there has been room for improvement in terms of simplification of information management.

SUMMARY OF THE INVENTION

The problems to be solved by the present invention are as described above, and the methods for solving such problems and the effects thereof will be described below.

According to a first preferred embodiment of the present invention, there is provided a relay server with the following configuration. The relay server includes an account information registering unit, a relay group information registering unit, and a shared resource information registering unit. The account information registering unit stores account information about a client terminal. The relay group information registering unit stores relay group information containing information on a group of relay servers that permit connections among each other. The shared resource information registering unit stores shared resource information containing resource information and information on the client terminals that share a relevant resource. When an operation instruction regarding the resource that can be accessed by another client terminal is received from the client terminal stored in the account information registering unit, the relay server relays the operation instruction regarding the resource based on the relay group information. The shared resource information stored in the shared resource information registering unit can include message information regarding a message to be transmitted by the client terminal. When the message is transmitted by the client terminal stored in the account information registering unit, the message information regarding the message is relayed based on the shared resource information and the relay group information.

With the above-described configuration, each client terminal can form a virtual field with a desired destination via the relay server to share, if necessary, the resource held by each client terminal, and also, messaging among users that participate in the virtual field can be achieved.

The relay server preferably includes the following configuration. The client terminals that share the resource are arranged to be able to transmit a new message in response to the message. When the new message is transmitted by the client terminal stored in the account information registering unit, the relay server is arranged to relay the message information regarding the new message based on the shared resource information and the relay group information.

With the above-described configuration, each client terminal that shares the resource can exchange user opinions or other information by adding messages. Therefore, dense, duplex communication can be achieved, thereby improving efficiency of cooperative work.

In the relay server, the shared resource information stored in the shared resource information registering unit is preferably arranged to be able to register the message information therein in association with the resource.

With the above-described configuration, since the message information is stored in association with the shared resource, the resource and the message can be easily managed in an integrated manner.

It is preferable that in the relay server, when the client terminal that shares the resource deletes the resource, the shared resource information stored in the shared resource information registering unit is updated, and the message information associated with the deleted resource is also deleted.

With the above-described configuration, the management of the shared resource and the message in the integrated manner is further facilitated, and therefore, troublesome information management can be simplified.

The relay server preferably includes the following configuration. When the client terminal transmits the message in association with the resource, a message publicizing terminal can be specified from the client terminals that share the resource. The message information can include account information on the message publicizing terminal.

With the above-described configuration, since publicizing/unpublicizing of individual messages can be easily specified with respect to each client terminal, flexible information management can be achieved.

According to a second preferred embodiment of the present invention, there is provided a relay communication system including the following configuration. The relay communication system includes a plurality of relay servers, and each of the relay servers has an account information registering unit, a relay group information registering unit, and a shared resource information registering unit. The account information registering unit stores account information about a client terminal. The relay group information registering unit stores relay group information containing information on a group of relay servers that permit connections among each other. The shared resource information registering unit stores shared resource information containing resource information and information on the client terminals that share a relevant resource. When an operation instruction regarding the resource that can be accessed by another client terminal is received from the client terminal stored in the account information registering unit, the relay server relays the operation instruction regarding the resource based on the relay group information. The shared resource information stored in the shared resource information registering unit can include message information on a message to be transmitted by the client terminal. When the message is transmitted by the client terminal stored in the account information registering unit, the message information regarding the message is relayed based on the shared resource information and the relay group information. Accordingly, it can be arranged such that the resource held by the client terminal stored in the account information registering unit of a certain relay server can be indirectly accessed by the other client terminal, and further, the message can be transmitted to the other client terminal.

With the above-described configuration, each client terminal can form a virtual field with a desired destination via the plurality of relay servers to share, if necessary, the resource held by each client terminal, and also, messaging among users that participate in the field can be achieved.

It is preferable that in the relay communication system, the shared resource information stored in the shared resource information registering unit of the relay server can register the message information in association with the resource.

With the above-described configuration, since the message information is stored in association with the shared resource, the user does not have to perform troublesome operations, and the resource and the message can be managed in an integrated manner.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 6 illustrates content of relay group information.
FIG. 7 illustrates content of shared resource information.

FIG. 8 illustrates a specific example of message content information included in the shared resource information.

FIG. 15 illustrates an example of different content of the shared resource information.

DETAILED DESCRIPTION OF PREFERRED EMBODIMENTS

Figure 1:
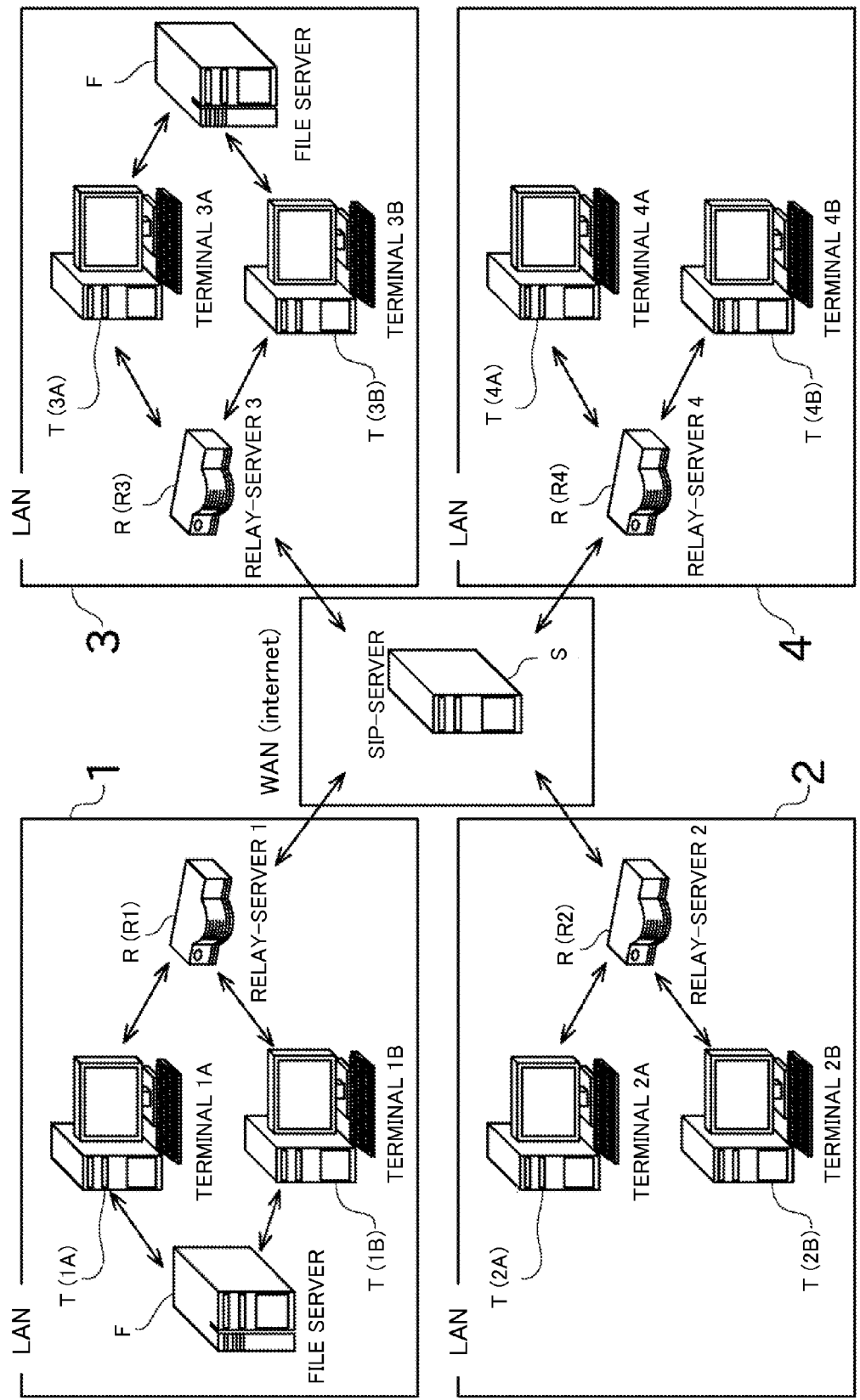
FIG. 1 is a network configuration diagram of a relay communication system according to a preferred embodiment of the present invention.

Preferred embodiments of the present invention will now be described with reference to the drawings. FIG. 1 is an explanation diagram illustrating an overall configuration of a relay communication system according to a preferred embodiment of the present invention.

As illustrated in FIG. 1, the relay communication system includes a plurality of LANs connected to a Wide Area Network (WAN). The relay communication system includes an external server S, a relay server R, a client terminal T, a file server F, and other similar devices.

The WAN is a network for connecting different LANs to each other. In the present preferred embodiment, the Internet is preferably used as the WAN.

The LAN is a relatively small-scale network built in a limited location. Typically, there are a plurality of LANs, each of which are at a physically remote location. In the present preferred embodiment, there is considered a case where a LAN 1 is built at a Tokyo branch office, and LANs 2, 3, 4 are respectively built, for example, at an Osaka branch office, a Nagoya branch office, and a Fukuoka branch office. Each of the four LANs 1, 2, 3, and 4 is connected to the Internet, which is a global network.

The external server S will now be described with reference to FIG. 2, which is a functional block diagram of the external server S. The external server S is a device used for the communication between the relay servers R arranged in each of the LANs 1, 2, 3, and 4 and is connected to the Internet.

Figure 2:
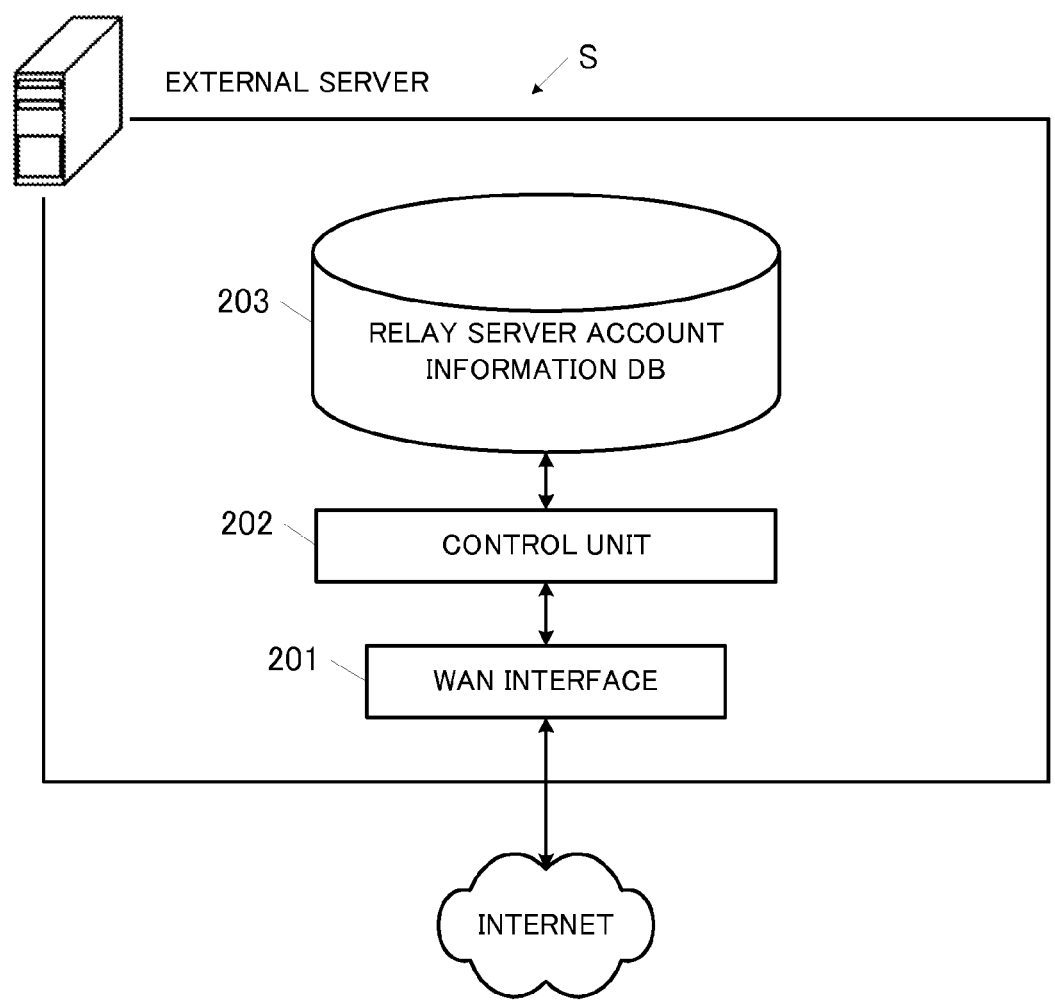
FIG. 2 is a functional block diagram of an external server.

The external server S illustrated in FIG. 2 has a function of serving as a Session Initiation Protocol (SIP) server. Specifically, the external server S has a function of serving as an SIP proxy server for relaying SIP methods and responses and as an SIP registrar server for registering an account of the relay server R.

As illustrated in FIG. 2, the external server S includes a WAN interface 201, a control unit 202, and a relay server account information database 203 as a main configuration.

The WAN interface 201 is an interface for communicating with each device, such as the relay server R connected to the Internet, using a global IP address.

The relay server account information database 203 is a database for managing the account of the relay server R that has made a registration request in association with the global IP address.

The control unit 202 is a processing unit that controls various communications performed through the WAN interface 201 and that controls communication processes complying with protocols such as TCP/IP, UDP, and SIP. For example, the control unit 202 executes processes such as a process of receiving the account of each relay server R from the relevant relay server R and registering the received account in the relay server account information database 203 and such as a process of relaying communication data such as various SIP methods and responses transmitted from the relay server R to another relay server R. The details of each function of the external server S centering on the control unit 202 will be described later.

The client terminal T will be described with reference to FIG. 3, which is a functional block diagram of the client terminal T.

The client terminal T is a terminal that can be directly operated by the user, and includes a personal computer (PC) and the like used by the user on a daily routine. A great number of client terminals T normally exist in the LAN, but in the present preferred embodiment, as illustrated in FIG. 1, there will be described a case where only client terminals 1A, 1B are connected to the LAN 1; client terminals 2A, 2B are connected to the LAN 2; client terminals 3A, 3B are connected to the LAN 3; and client terminals 4A, 4B are connected to the LAN 4, by way of example. A private IP address uniquely managed in the same LAN is given to each client terminal T.

Figure 3:
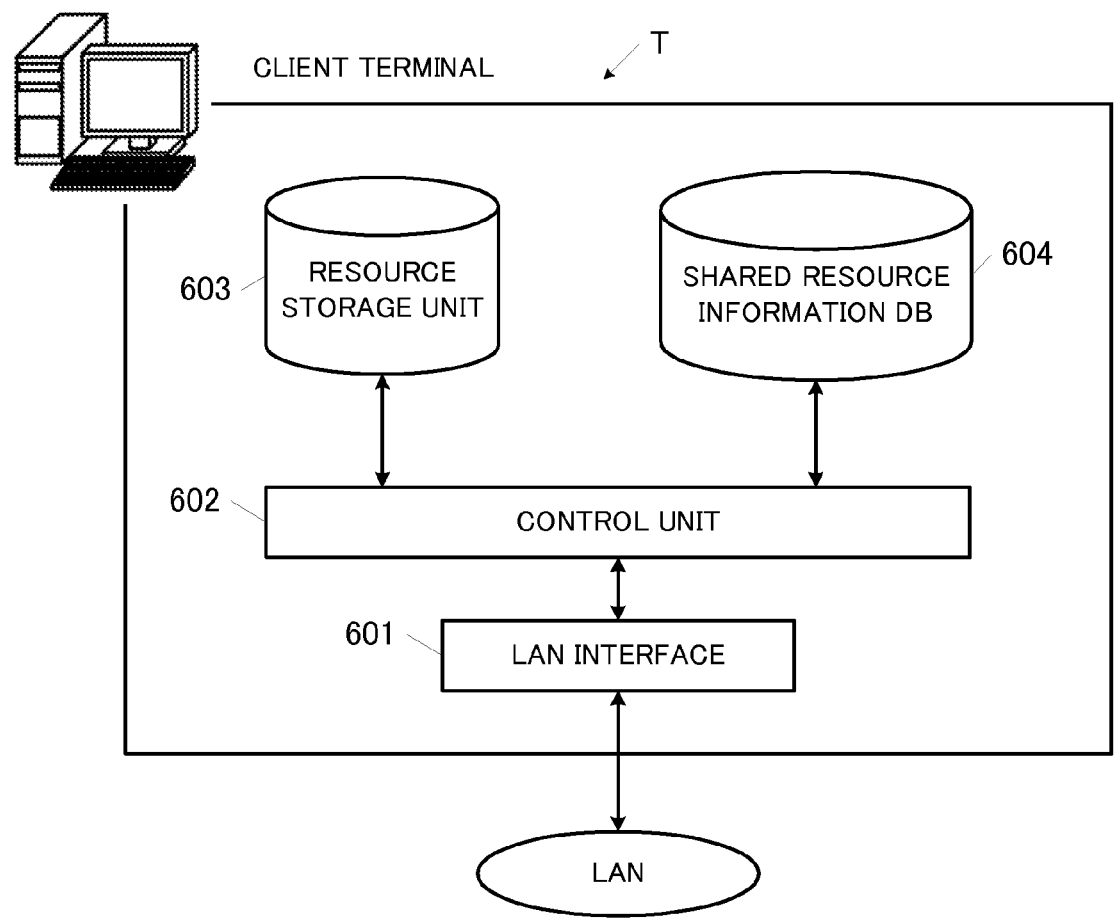
FIG. 3 is a functional block diagram of a client terminal.

As illustrated in FIG. 3, the client terminal T includes a LAN interface 601, a control unit 602, a resource storage unit 603, and a shared resource information database 604 as a main configuration.

The LAN interface 601 is an interface for communicating with each device, such as the relay server R and the file server F connected to the same LAN, using the private IP address.

The resource storage unit 603 stores resources, such as files and folders, operable by the client terminal T.

The shared resource information database 604 stores shared resource information held by each client terminal T and shared resource information in which message information exchanged among each client terminal T is registered.

The control unit 602 is a processing unit for controlling various communications performed through the LAN interface 601. The control unit 602 controls communication processes complying with protocols such as TCP/IP, UDP, and SIP.

For example, the control unit 602 executes a process of controlling movement, change, deletion, etc. of the resources stored in the resource storage unit 603. The control unit 602 also performs a process of updating the shared resource information stored in the shared resource information database 604 when a change notification of the shared resource information is received from the relay server R. The details of the functions of each client terminal T centering on the control unit 602 will be described later.

The relay server R will now be described with reference to FIG. 4, which is a functional block diagram of each relay server R.

As illustrated in FIG. 1, one relay server R is arranged in each of the LANs 1, 2, 3, and 4. Specifically, a relay server R1 is arranged in the LAN 1, a relay server R2 is arranged in the LAN 2, a relay server R3 is arranged in the LAN 3, and a relay server R4 is arranged in the LAN 4.

The relay server R is connected to the LAN and can communicate with each client terminal T connected to the same LAN. The relay server R is also connected to the Internet and can communicate with the relay servers R connected to the other LANs through the external server S. For such communication, both the private IP address and the global IP address are given to each relay server R.

Figure 4:
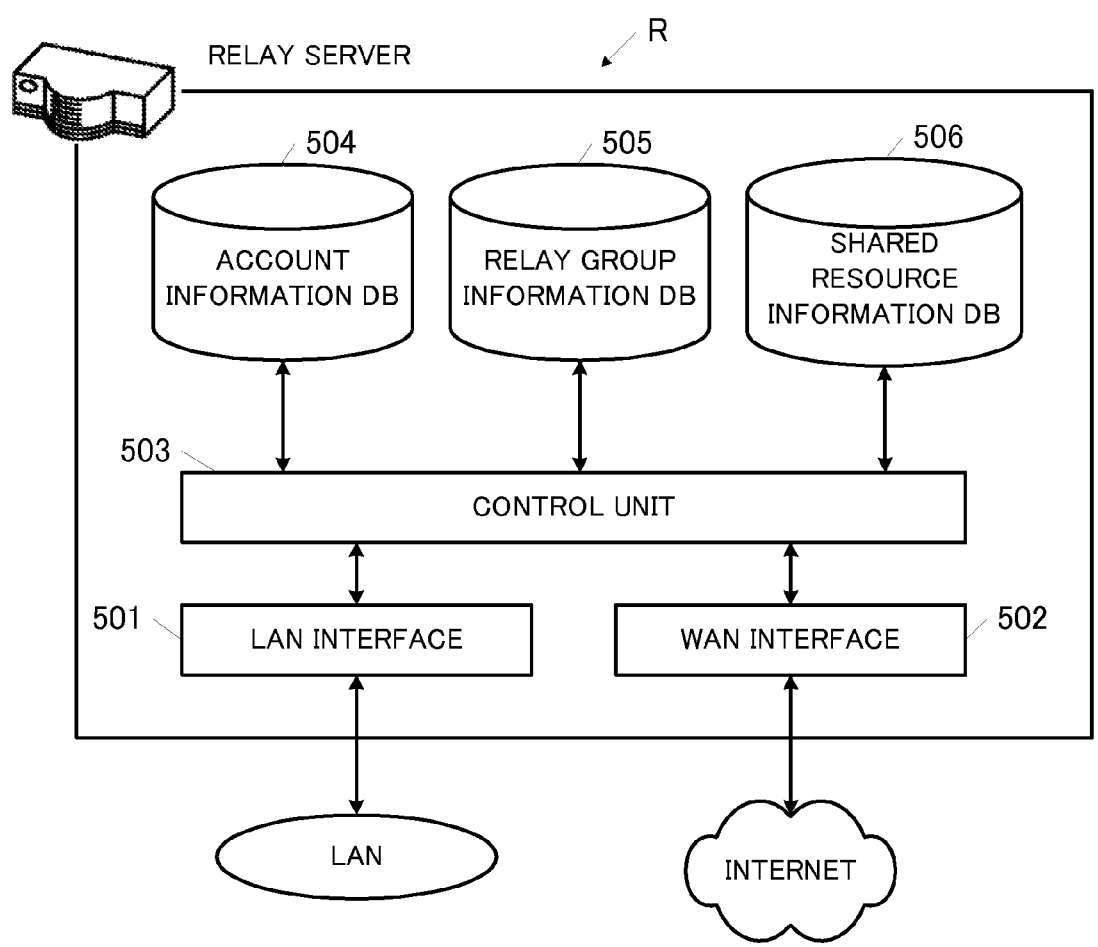
FIG. 4 is a functional block diagram of a relay server.

As illustrated in FIG. 4, the relay server R includes a LAN interface 501, a WAN interface 502, a control unit 503, an account information database 504, a relay group information database 505, and a shared resource information database 506 as a main configuration.

The LAN interface 501 is an interface for communicating with the client terminals T connected to the same LAN as itself using the private IP address. For example, the relay server R1 can communicate with each client terminal 1A, 1B by using the LAN interface 501 in the LAN 1.

The WAN interface 502 is an interface for communicating with each device, such as the external server S connected to the Internet, using the global IP address.

Each relay server R has a function of serving as the SIP registrar server, and the communication between each relay server R and each client terminal T is performed using the SIP. For example, the relay server R2 functions as the SIP registrar server in the LAN 2, receives the account of each client terminal 2A, 2B connected to the LAN 2, and registers the account in the account information database 504.

Figure 5:
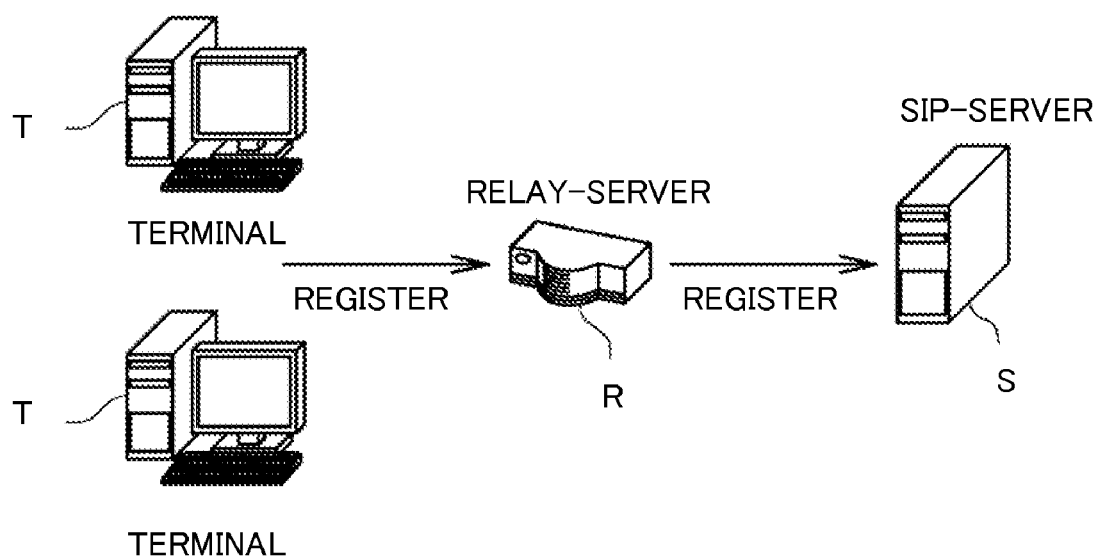
FIG. 5 illustrates the relationship of the client terminal, the relay server, and the external server.

As illustrated in FIG. 5, in the relationship with the client terminal T, the relay server R functions as a server for receiving the account information from the relevant client terminal T and registering (REGISTER) the received account. In the relationship with the external server S, the relay server R functions as a client for transmitting the account information to the external server S and registering (REGISTER) the transmitted account.

The account information database 504 in FIG. 4 is a database for managing the account of the client terminal T, in association with the private IP address that has made a registration request.

The relay group information database 505 is a database for managing relay group information related to the client terminal T registered in the account information database 504.

The shared resource information database 506 is a database for managing the shared resource information related to the client terminal T registered in the account information database 504.

The control unit 503 is a processing unit for controlling various communications performed via the LAN interface 501 and the WAN interface 502 and for controlling various communication processes complying with protocols such as TCP/IP, UDP, and SIP.

For example, the control unit 503 executes a process of transmitting the its own account information to the external server S and of requesting for registration, a process of creating the relay group information to store in the relay group information database 505, a process of creating the shared resource information to store in the shared resource information database 506, and other similar processes. The details of each function of the relay server R centering on the control unit 503 and other devices will be described later.

The file server F will now be described. As illustrated in FIG. 1, the file server F is connected to the LAN and can communicate with each client terminal T connected to the same LAN.

The file server F is configured to store the resources, such as files and folders, and is configured to function as a resource storage unit alternative to the resource storage unit 603 (FIG. 3) arranged in each client terminal T. In other words, in the present preferred embodiment, the resource that can be accessed by each client terminal T may be stored in a local disc drive of the relevant client terminal T and/or may be stored in the file server F serving as a network drive. The file server F is not essential in each LAN, and the installation of the file server F is omitted in the LANs 2 and 4 in the example of FIG. 1.

The relay group information and the shared resource information, which are information handled in the present relay communication system, will now be described.

First, the relay group information 100 will be described with reference to FIG. 6. FIG. 6 illustrates an example of the content of the relay group information. As illustrated in FIG. 6, relay group information 100 stored in the relay group information database 505 includes one piece of group identifying information 101 and relay account information 102 of the relay servers R that form a relay group by permitting connection with one another.

The group identifying information 101 is information for identifying the relay group information 100 and is given a different ID so as to be uniquely identified each time the relay group information 100 is created. Therefore, an operator or user can specify the relay group based on the group identifying information 101 and easily change or alter a group configuration.

The relay account information 102 includes account information on each relay server R that forms the relay group by permitting connection with one another. The relay account information 102 includes the account information and other information of the client terminal T that is connected to the same LAN as each relay server R that forms the relay group and that is registered in the relay server R.

In the relay account information 102, a specific name given to the account of each relay server R is also registered be easily identified by the operator or user. For example, in relay account information 102a of the relay server R1 (relay-server 1), the account (relay-server1@net) of the relay server R1 and a name (branch office A) given to the account are described. Relay account information 102 can also include relay account information 102b and 102c that contains similar information to the information in relay account information 102a.

In the relay account information 102, the specific name given to the account is also registered in a portion of the account of the client terminal T connected to the same LAN as the relay server R to be easily identified by the operator or user. For example, in the client terminal (terminal 1A), a name (terminal 1A) given to the account (for example, user1A@relay-server1.net) is described. Further, division identifying data 103 indicating a division to which the client terminal T belongs, such as a sales division and a development division, is also described in the account of the client terminal T.

As described above, the relay group information 100 is created to be uniquely identified with respect to each relay group. The relay group information 100 includes the account (relay account information 102) of each relay server forming a group (relay group) by permitting the connection with one another. Further, the relay account information 102 includes the account information on the client terminal T registered in and connected to the same LAN as the relevant relay server.

Accordingly, by referencing the relay group information 100, it is apparent as to which LANs form the group and as to which relay server R and client terminal T are registered in the relevant LANs. The relay group information 100 is exchanged between each relay server R that forms the relay group.

The content of the shared resource information will now be described with reference to FIGS. 7 and 8. FIG. 7 illustrates an example of shared resource information 120 stored in the shared resource information database 604 of the client terminal 1A. The same information is also stored in the shared resource information database 506 of the relay server R1 connected to the same LAN as the client terminal 1A.

The shared resource information 120 includes account identifying information 121 indicating the shared resource information regarding the client terminal 1A and includes individual shared resource information 122 related to the client terminal 1A.

The shared resource information 120 is created with respect to each client terminal T, and the account identifying information 121 is information for identifying the shared resource information.

The individual shared resource information 122 includes shared resource identifying information 123, family account information 124, family resource information 125, message thread information 126, and other similar information.

The shared resource identifying information 123 identifies the individual shared resource information 122 and is given a different ID each time the individual shared resource information 122 is created so as to be uniquely identified. The shared resource identifying information 123 includes an ID (e.g., 20061001150032user1A@relay-server1.net) associated with the client terminal T that has made a request to create the shared resource information 120 and includes a name (projectA) for facilitating the identification thereof.

Thus, the operator or user can specify the individual shared resource information 122 based on the shared resource identifying information 123 and easily edit or alter the content of that information.

The family resource information 125 is an aggregate of resource information 127 indicating resources, such as files and folders, held by the client terminal T. Each resource information 127 includes information (e.g., name="projectA-folder") of the name of the shared resource, account information (e.g., owner="user1A@relay-server1.net") of the client terminal T (owner client terminal) capable of accessing the relevant resource, information (e.g., value="c:/folderA") of an address indicating the location of the resource, and message thread identifying information (e.g., msg="msg:thread1") for specifying the message thread, which will be described later.

The family account information 124 is an aggregate of information on the account (e.g., user1A@relay-server1.net) of the client terminal T that shares the resource indicated in the family resource information 125. The family account information 124 includes information on the owner client terminal T and information on the client terminal T (user client terminal) capable of indirectly accessing the resource through the owner client terminal T. The user client terminal T cannot directly access the resource, but can indirectly access the resource through the owner client terminal T.

The message thread information 126 is information for registering a series of messages that are exchanged in association with each resource registered in the resource information 127. The message thread information 126 includes message thread identifying information 128 and message information 129.

The message thread information 126 is created with respect to each thread, and the message thread identifying information 128 is information for identifying the message thread information. When the message thread identifying information (e.g., msg="msg:thread1") is referenced in the resource information 127, the resource information 127 and the message thread information 126 are associated with each other.

The message information 129 is created each time one message is transmitted from the client terminal T. One, or a plurality of, message information 129 is registered in each message thread information 126.

The message information 129 includes message identifying information 130 and message content information 131.

The message information 129 is created with respect to each message, and the message identifying information 130 is information for identifying the message information.

The specific content of the message transmitted from the client terminal T is described in the message content information 131. Although simply illustrated in FIG. 7, contents of message content information 131a, 131b, and 131c are illustrated in FIG. 8 in detail. As illustrated in FIG. 8, in the present preferred embodiment, the message content information 131 is described in a format complying with a publicly-known e-mail format.

The message content information 131 includes a header 132 and a body 133. The header 132 includes transmission date and time of the message (Date header), a transmission source (From header), a transmission destination (To header), a subject name (Subject header), an identifying ID (Message-Id header), information on encoding of the message (MIME-Version header), and other similar information. The content of body text of the message is described in the body 133. In the present preferred embodiment, a character string can be created by performing Multipurpose Internet Mail Extensions (MIME) encoding on a Japanese text message is described in the body 133.

As described above, the shared resource information database 506 included in the relay server R is arranged to store the shared resource information 120 (FIG. 7) containing the family resource information 125 describing the resource information and the family account information 124 describing the account of the client terminal T that shares the resource. Moreover, the shared resource information 120 can register a series of message information 129 therein in association with each resource (resource information 127) described in the family resource information 125.

Figure 9:
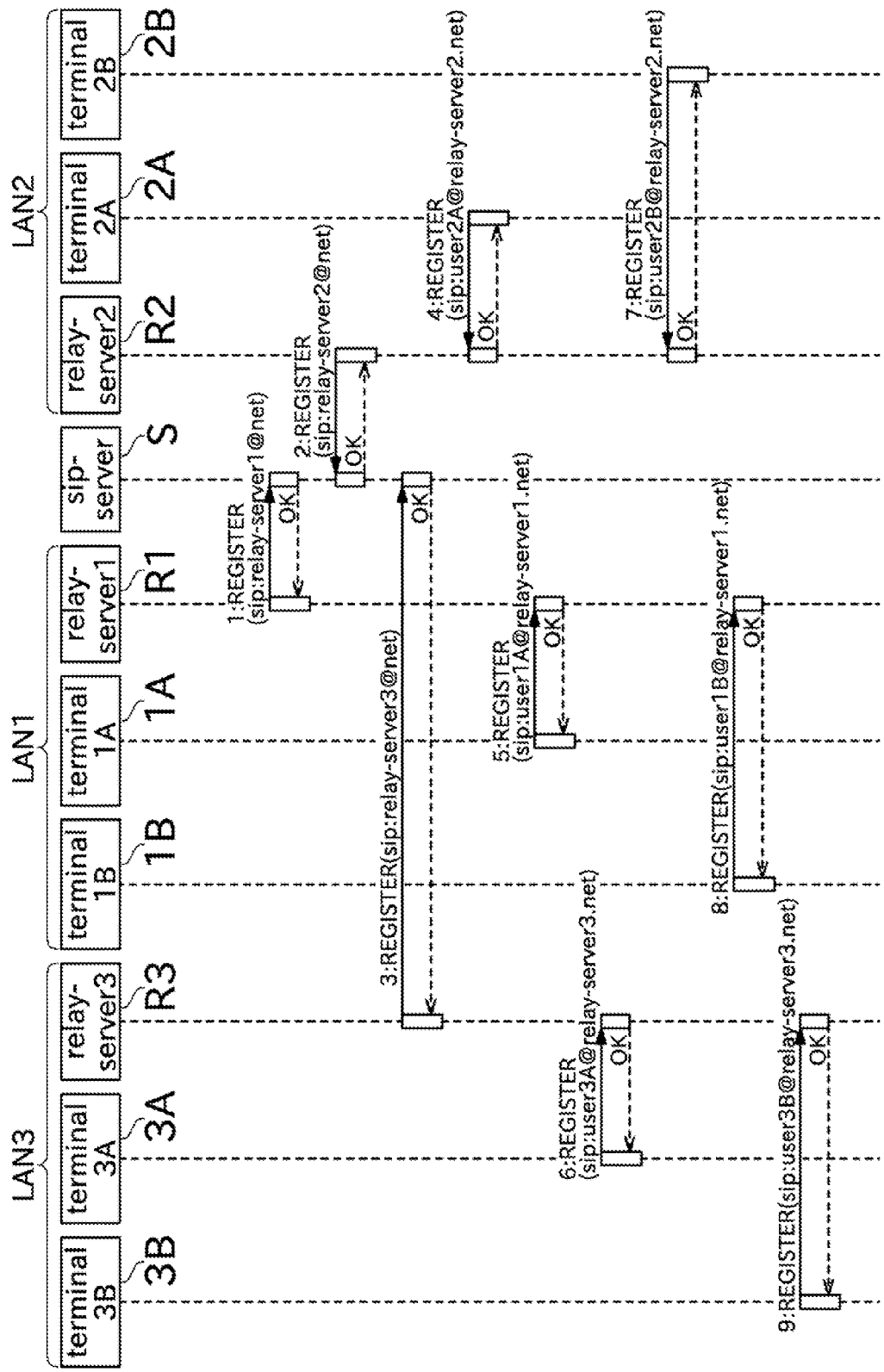
FIG. 9 is a sequence chart illustrating a communication process for registering the relay server and the client terminal.

The flow of a communication process in the relay communication system configured as described above will be described below using a sequence chart shown in FIG. 9. The sequence numbers 1 through 9 illustrated in FIG. 9 indicate registration stages of the account of each device.

In sequence number 1, the relay server R1 transmits a registration request (REGISTER) of the account to the external server S. The relay server R1 makes a request for registration of its own account (sip: relay-server1@net). The external server S returns an OK response to the relay server R1 and registers the account of the relay server R1 and the global IP address of the relay server R1 in the relay server account information database 203 in association with each other.

Similarly, the relay servers R2 and R3 make a registration request (REGISTER) of its own account to the external server S to register the account etc. of its own device in the external server S (sequence numbers 2, 3).

In sequence number 4, the client terminal 2A transmits a registration request (REGISTER) of its own account to the relay server R2. The client terminal 2A makes a request for registration of its own account (sip: user2A@relay-server2.net). The relay server R2 returns an OK response and registers the account and the private address of the client terminal 2A in the account information database 504 in association with each other.

Similarly, the client terminals 1A, 3A, 2B, 1B, and 3B make a request for registration of its own account to the respective relay servers R to register the account etc. of its own device in the relay server R (sequence numbers 5 through 9).

The registration of the account of each relay server R in the external server S and registration of the account of each client terminal T in the relay server R are completed through the above processes. The sequence described above is an example, and the order may be arbitrarily set as long as the registration of the account of each device is completed as a result. As explained above, the number of terminals in each LAN is not limited to two terminals and can be a very large number of terminals.

Even the relay server R and the client terminal T existing on the network cannot participate in the relay communication system of the present preferred embodiment unless the each of their accounts is registered. For example, the relay server R4 and the client terminals 4A, 4B of FIG. 1 cannot participate in the communication described below because their account registrations have not been performed in the process of FIG. 9.

Figure 10:
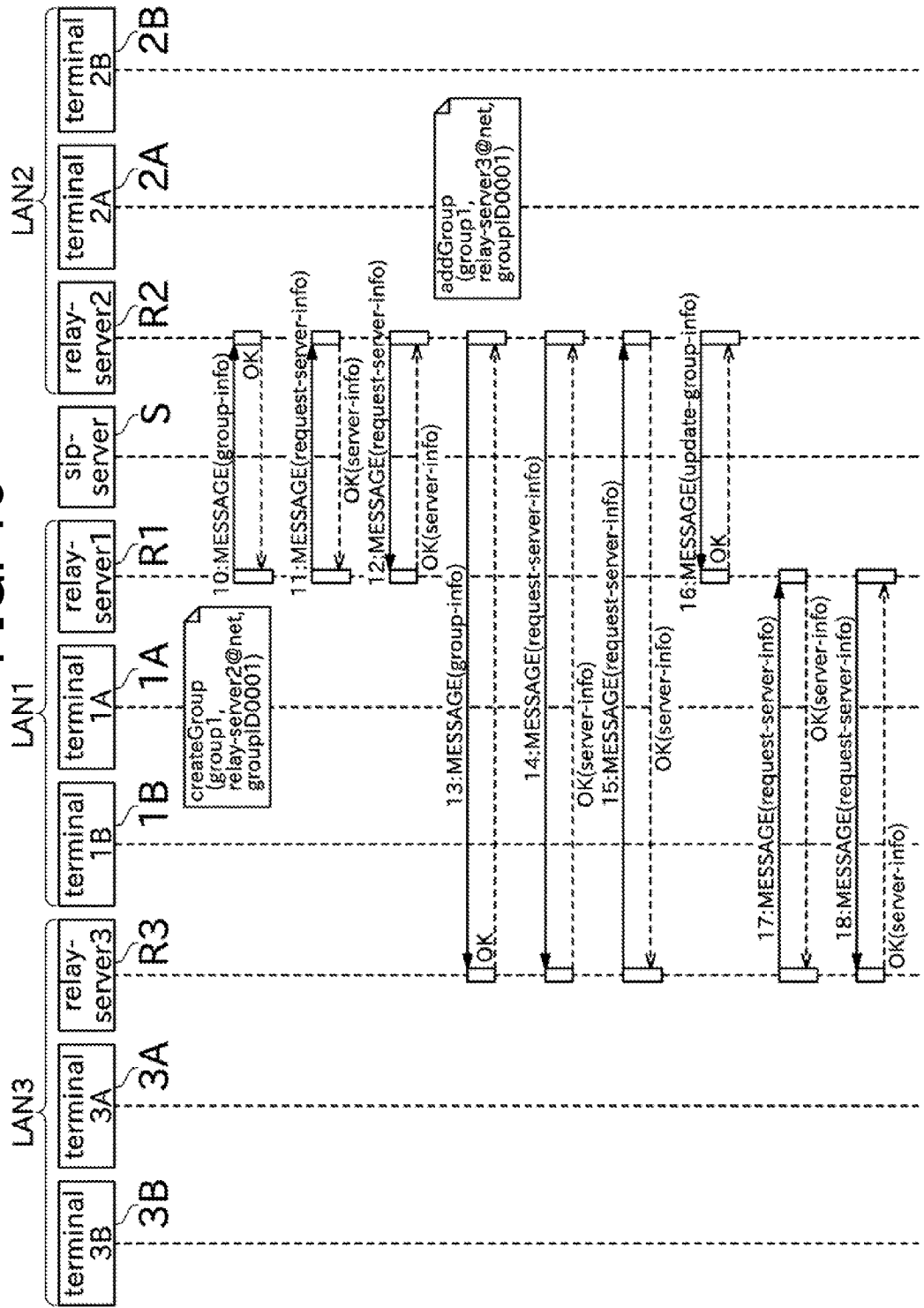
FIG. 10 is a sequence chart illustrating a communication process for forming a relay group with three relay servers.

The generation and registration stages of the relay group will now be described with reference to sequence numbers 10 through 18 of FIG. 10. The processes of sequence numbers 1 through 18 illustrated in FIGS. 9 and 10 are generally carried out as an initial setup of the network by the user or operator.

First, in the relay server R1, a METHOD (createGroup METHOD) for newly forming a relay group with the relay server R2 is executed by the operator or user. In the createGroup METHOD, there are specified a group name (group1), the account (relay-server2@net) of the relay server R2 with which the relay group is formed, and an identification ID (groupID0001) given to the newly created relay group.

A message transmission command (MESSAGE METHOD) is then executed in the relay server R1, and a group-info message is transmitted to the relay server R2 (sequence number 10). This message contains the group name, the identification ID of the relay group, and other similar information specified in the createGroup METHOD.

In this MESSAGE METHOD, the account (sip: relay-server2@net) of the relay server R2 of a message transmission destination is specified. Having received the message, the relay server R2 returns an OK response to the relay server R1. Instead of being transmitted directly to the relay server R2, the group-info message can be transmitted to the relay-server R2 via the external server S. The external server S acquires the global IP address of the relay server R2 by referencing the relay server account information database 203 and relays the group-info message from the relay server R1 to the relay server R2. Any transmission between relay servers either can be directly between the relay servers or can be transmitted via the external server S.

The communication between each relay server R of the present preferred embodiment is performed through the external server S and is the same in the following description. Therefore, specific description of the communication process through the external server S will be omitted in the following description.

The relay server R1 then transmits a transmission request message (request-server-info message) of server information to the relay server R2 (sequence number 11). Having received the message, the relay server R2 returns the information (server-info) of its own device to the relay server R1 along with an OK response.

On the other hand, the relay server R2 transmits a request-server-info message to the relay server R1 (sequence number 12), and the relay server R1 returns its own information (server-info) to the relay server R2.

Through the exchange of the information on the respective servers carried out in the above manner, the relay group information 100 indicating that the relay servers R1, R2 have formed the relay group is generated, and stored in the relay group information database 505 of each relay server R1, R2.

Next, in the relay server R2, a METHOD (addGroup METHOD) of newly adding the relay server R3 to the previously created relay group (relay group configured by the relay servers R1, R2) is executed by the operator. In the addGroup METHOD, the group name (group1) of the relay group to be added to, the account (relay-server3@net) of the relay server R3 to be added, and the identification ID (groupID0001) of the relay group to be added to are specified.

Then, the relay server R2 transmits a group-info message to the relay server R3 to be added (sequence number 13). This message contains the group name, the identification ID of the relay group, and other similar information specified in the addGroup METHOD. Having received the message, the relay server R3 returns an OK response to the relay server R2. The server information is exchanged between the relay server R2 and the relay server R3 (sequence numbers 14, 15) in a manner exactly the same to the above-described sequence numbers 11 and 12.

The relay server R2 transmits an update-group-info message notifying that the relay server R3 has been added to the relay group to the relay server R1 (sequence number 16). Having received the message, the relay server R1 returns an OK response to the relay server R2. Thereafter, the server information is exchanged between the relay server R3 and the relay server R1 (sequence numbers 17, 18).

The relay group information 100 (specifically, information on the content illustrated in FIG. 6) indicating that the three relay servers R1, R2, and R3 form the relay group is stored in the relay group information database 505 of each relay server R1, R2, and R3.

An operation of actually sharing the resource of the client terminal T and exchanging the message at the same time will be described with reference to FIG. 11. An example will be described in which a folder "folderA" held by the client terminal 1A and files "file001.xls" and "file002.doc" held by the file server F of the LAN 1 are shared by the client terminals 2A and 3A.

The user operates the client terminal 1A and instructs the client terminal 1A to display a list of client terminals that can share the files with the client terminal 1A. Accordingly, the client terminal 1A references the stored content (relay group information 100) of the relay group information database 505 to display on a screen the list of client terminals T that are connected to the LAN to which any of the relay servers R forming the relay group with the relay server R1 in the same LAN as the client terminal 1A is connected.

Here, the five client terminals 1B, 2A, 2B, 3A, and 3B are displayed as the terminals that can share the files based on the content of the relay group information 100 of FIG. 6. The user can specify the client terminal (the user client terminal) for actually sharing the resource from the displayed five terminals. In this example, the user specifies the client terminals 2A and 3A to share the files.

Figure 11:
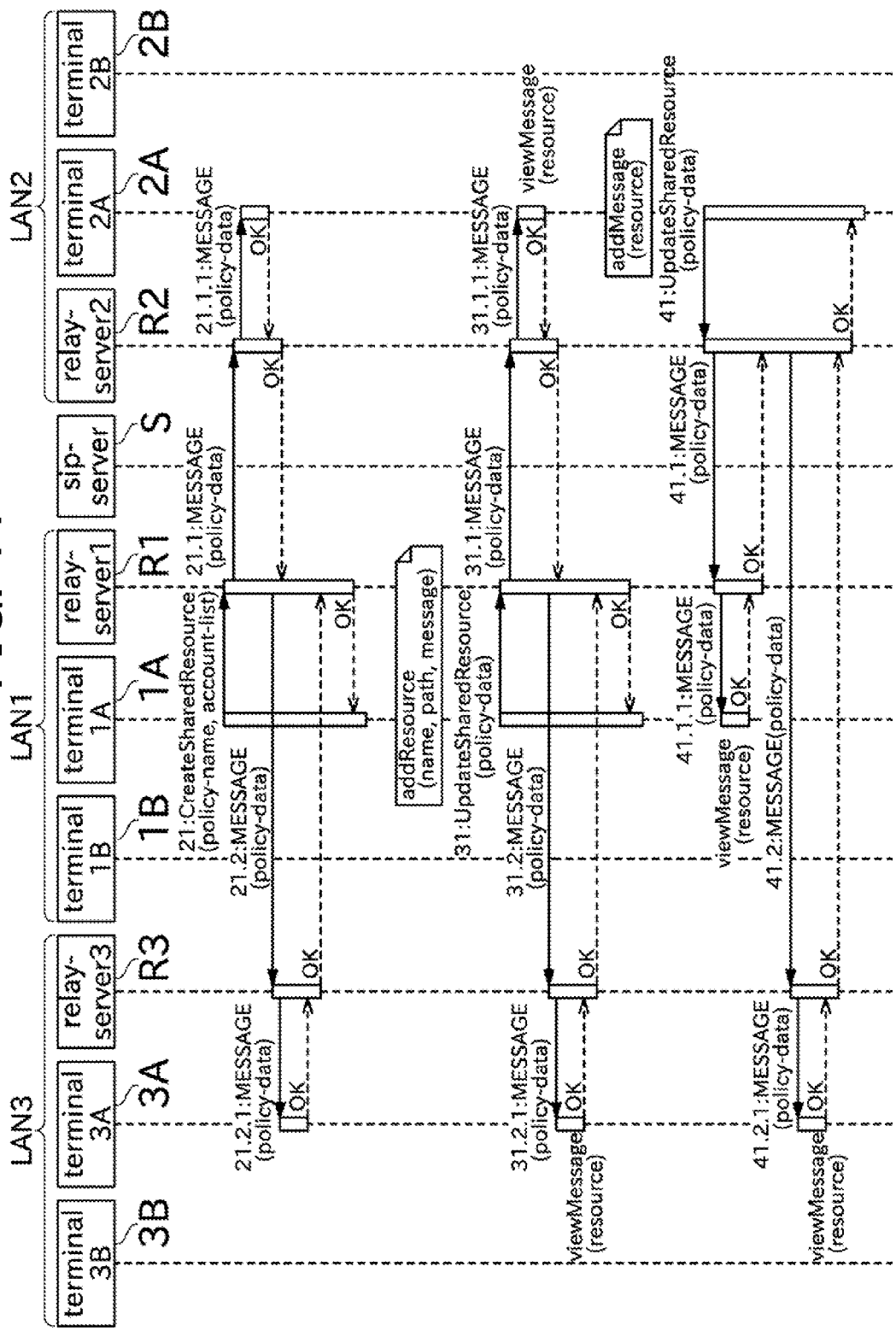
FIG. 11 is a sequence chart illustrating a communication process for registering a shared resource in the relay group and exchanging messages.

The client terminal 1A then transmits a request to create the shared resource (CreateSharedResource command) to the relay server R1 (sequence number 21 of FIG. 11). This message contains the group identifying information 101 and the information on the specified user client terminals 2A and 3A.

Having received the message, the relay server R1 creates the shared resource information 120 to store in its own shared resource information database 506. The relay server R1 references the content of the relay group information database 505 based on the identifying ID of the relay group, transmits a policy-data message to the other relay servers R2, R3 forming the relay group, and notifies of the created shared resource information 120 (sequence numbers 21.1, 21.2).

Having received the message, each relay server R2, R3 stores the shared resource information 120 in its own shared resource information database 506, transmits the policy-data message to each specified user client terminal 2A, 3A, and notifies of the shared resource information 120 (sequence numbers 21.1.1, 21.2.1). Having received the message, each user client terminal 2A, 3A changes the shared resource information 120 stored in its own shared resource information database 604 and returns an OK response to the relay servers R2, R3 of transmission source. Having received the OK response, the relay servers R2, R3 return an OK response to the relay server R1, and having received the OK response, the relay server R1 returns an OK response to the client terminal 1A.

Thus, the shared resource identifying information 123 and the family account information 124 have been described in the shared resource information 120 stored in the shared resource information database 506 of the relay servers R1, R2, and R3. The same content is also described in the shared resource information 120 stored in the shared resource information database 604 of the client terminals 1A, 2A, and 3A. Thus, a virtual field in which the client terminals 1A, 2A, and 3A participate over the respective LANs is formed.

When the user operates the client terminal 1A and executes an add Resource METHOD, a process of adding the resource information (reference numeral 127 of FIG. 8) indicating the resource to be shared and the message information (reference numeral 129 of FIG. 8) to the shared resource information 120 is performed.

In this example of a preferred embodiment, it is assumed that specification is made to select "folderA" from the resource stored in the resource storage unit 603 of the client terminal 1A, to select "file001.xls" and "file002.doc" from the resource stored in the file server F, and to share the selected folder and files with the other client terminals 2A, 3A. When sharing the folder and files, "projectA-folder," "file00ZX.xls," and "file00ZY.doc" are respectively given as file names to the "folderA", "file001.xls", and "file002.doc".

It is also assumed that the user creates a message with the content including the subject name, "creation of workspace for project A," and the body text, "development resource for the project A will be managed here," in association with the shared resource, "folderA." The transmission destination (the terminal that will publicize the message) of the message can be arbitrarily selected and specified from the client terminals 2A and 3A, which share the "folderA." In this example, the user specifies both the client terminals 2A and 3A as the transmission destinations.

The client terminal 1A for which the user has performed the above operation changes the content of the shared resource information 120 stored in the shared resource information database 604 based on the specified content. As a result, the resource information 127 regarding the "folderA" and the message information 129 regarding the "creation of workspace for project A" are registered in the shared resource information 120.

Reference numeral 131a of FIG. 8 denotes an example of message content information on the message information 129. As illustrated in the message content information 131a, in this example, the account of the client terminal 1A is recorded in a portion of the transmission source (From header), and the accounts of the client terminals 2A and 3A, which are message publicizing terminals, are recorded in a portion of the transmission destination (To header) in the header 132. Further, the information on the transmission date and time is described in the header 132 as well as the information on the encoded subject name and body text.

The client terminal 1A transmits a shared resource change request (UpdateSharedResource command) including the content of the changed shared resource information 120 to the relay server R1 (sequence number 31 of FIG. 11). Having received the shared resource change request, the relay server R1 stores the changed shared resource information in the shared resource information database 506 of its own device. Accordingly, the resource information 127 and the message information 129 are registered in the shared resource information 120 stored in the shared resource information database 506 of the relay server R1.

The relay server R1 transmits the policy-data message to the relay servers R2 and R3 respectively connected to the user client terminals 2A and 3A and notifies of the changed shared resource information 120 (sequence numbers 31.1 and 31.2).

Having received the message, each relay server R2 and R3 stores the shared resource information 120 in its own shared resource information database 506 and transmits the policy-data message to each specified user client terminal 2A and 3A to notify of the shared resource information 120 (sequence numbers 31.1.1 and 31.2.1).

Having received the message, each user client terminal 2A, 3A that has received the message changes the shared resource information 120 stored in its own shared resource information database 604 and analyzes the message information 129 included in the shared resource information 120. Then, each user client terminal 2A and 3A determines whether or not the message is for its own device (whether or not its own device is the message publicizing terminal for the message) based on the information on the transmission destination (the content of the "To" header) described in the header 132 of the message information 129. Then, when the message is for its own device, the relevant client terminal executes a viewMessage METHOD to display the message.

Figure 12:
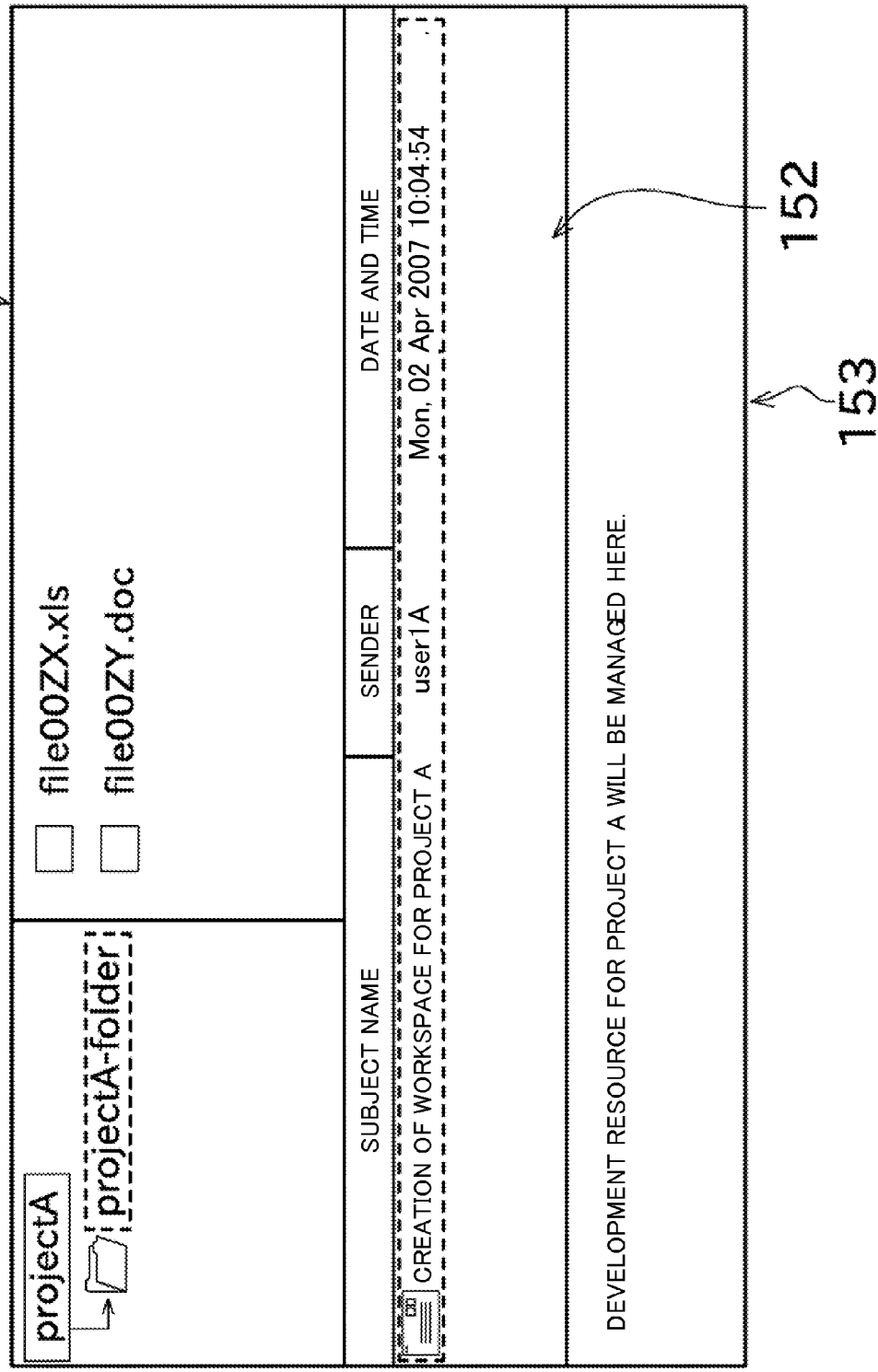
FIG. 12 is an explanation diagram of an example in which the message is displayed by using client software executed by the client terminal.

FIG. 12 illustrates the message displayed on the client terminal T. FIG. 12 illustrates a screen display image of client software executed by the client terminal 2A. In the client software, information regarding the shared resource is displayed on an upper side portion (upper pane 151), a list of messages of the message thread regarding the shared resource is displayed on a middle section (middle pane 152), and the content of the selected message is displayed on a lower side portion (lower pane 153).

The upper pane 151 is divided into right and left, and a folder structure of the shared resource is displayed in a tree view on the left side. In this example, because the folder "folderA" is shared under the name of "projectA-folder" (refer to the shared resource information 120 of FIG. 7), the shared folder is displayed under the name of "projectA-folder" on the client software.

The shared files in the shared folder are displayed in a view format on the right side of the upper pane 151. In this example, as illustrated in FIG. 7, the file "file001.xls" is shared under the name of "file00ZX.xls", and the file "file002.doc" is shared under the name of "file00ZX.xls". Accordingly, in the client software, the two shared files "file00ZX.xls" and "file00ZY.doc" are displayed as illustrated in FIG. 12.

The shared folder selected in the upper pane 151 or the list of messages associated with the shared file is displayed in the middle pane 152. FIG. 12 illustrates a state in which the user has selected the "projectA-folder" in the upper pane 151. Accordingly, a list of the messages associated with the "projectA-folder" is displayed in the middle pane 152. Here, the subject name "creation of workspace for project A," a transmitter "user1A," and the transmission date and time thereof "Mon, 2 Apr. 2007 10:04:54" are displayed.

The body text of the message selected in the middle pane 152 is displayed on the lower pane 153. FIG. 12 illustrates a state in which the user has selected the message with the subject name "creation of workspace for project A." Accordingly, the body text of the message, "development resource for the project A will be managed here," is displayed on the lower pane 153.

In this example, the client terminal 1A also shares the same resource with the client terminal 3A and transmits the same message to the client terminal 3A (refer to the shared resource information 120 of FIGS. 7 and 8). Therefore, a displaying screen of the client terminal 3A is similar to a displaying screen of the client terminal 2A illustrated in FIG. 12.

After executing the viewMessage METHOD to display the message as described above, as illustrated in FIG. 11, the client terminals 2A and 3A respectively returns an OK response to the relay servers R2 and R3, which are transmission sources. Having received the OK response, the relay servers R2 and R3 returns an OK response to the relay server R1. Having received the OK response, the relay server R1 returns an OK response to the client terminal 1A.

Next, although not illustrated, it is assumed that, on the client terminal 1A, the user performs an operation of transmitting a new message in association with the already shared resource "file001.xls" to the client terminals 2A and 3A. The subject name of the message is "schedule file," and a body text of certain content is included in the message. In this case, the content of the new message is added as the message information 129 to the shared resource information 120, and a process similar to sequence numbers 31 through 31.2.1 is performed. Eventually, the client software of the client terminals 2A and 3A displays on their respective screens the message with the subject name "schedule file."

Next, the user of the client terminal 2A transmits a message with the subject name "Re: schedule file" and the body text "Confirmed" to the client terminals 1A and 3A as the destinations in response to the message with the subject name "schedule file."

In this case, the client terminal 2A changes the content of the shared resource information 120 stored in the shared resource information database 604 based on the content of the return message. As a result, the message information 129 regarding "Re: schedule file" is additionally registered in the portion of the message thread identical to the message with the subject name "schedule file."

The client terminal 2A then transmits a shared resource change request (UpdateSharedResource command) including the content of the changed shared resource information 120 to the relay server R2 (sequence number 41 of FIG. 11). Having received the shared resource change request, the relay server R2 stores the changed shared resource information in its own shared resource information database 506. Accordingly, the resource information 127 and the message information 129 are also registered in the shared resource information 120 stored in the shared resource information database 506 of the relay server R2.

The relay server R2 then transmits a policy-data message to the relay servers R1 and R3 to which the user client terminals 1A and 3A are respectively connected and notifies of the changed shared resource information 120 (sequence numbers 41.1 and 41.2).

Having received the message, each relay server R1 and R3 stores the shared resource information 120 in its own shared resource information database 506, transmits the policy-data message to each specified user client terminals 1A and 3A, and notifies of the shared resource information 120 (sequence numbers 41.1.1 and 41.2.1).

Having received the message, each user client terminal 1A and 3A changes the shared resource information 120 stored in its own shared resource information database 604 and analyzes the message information 129 included in the shared resource information 120. Then, each client terminal 1A and 3A determines whether or not the message is for its own device based on the information (content of To header) of the transmission destination described in the header 132 of the message information 129. If the message is for its own device, the relevant user client terminal executes the viewMessage METHOD to display the message.

Figure 13:
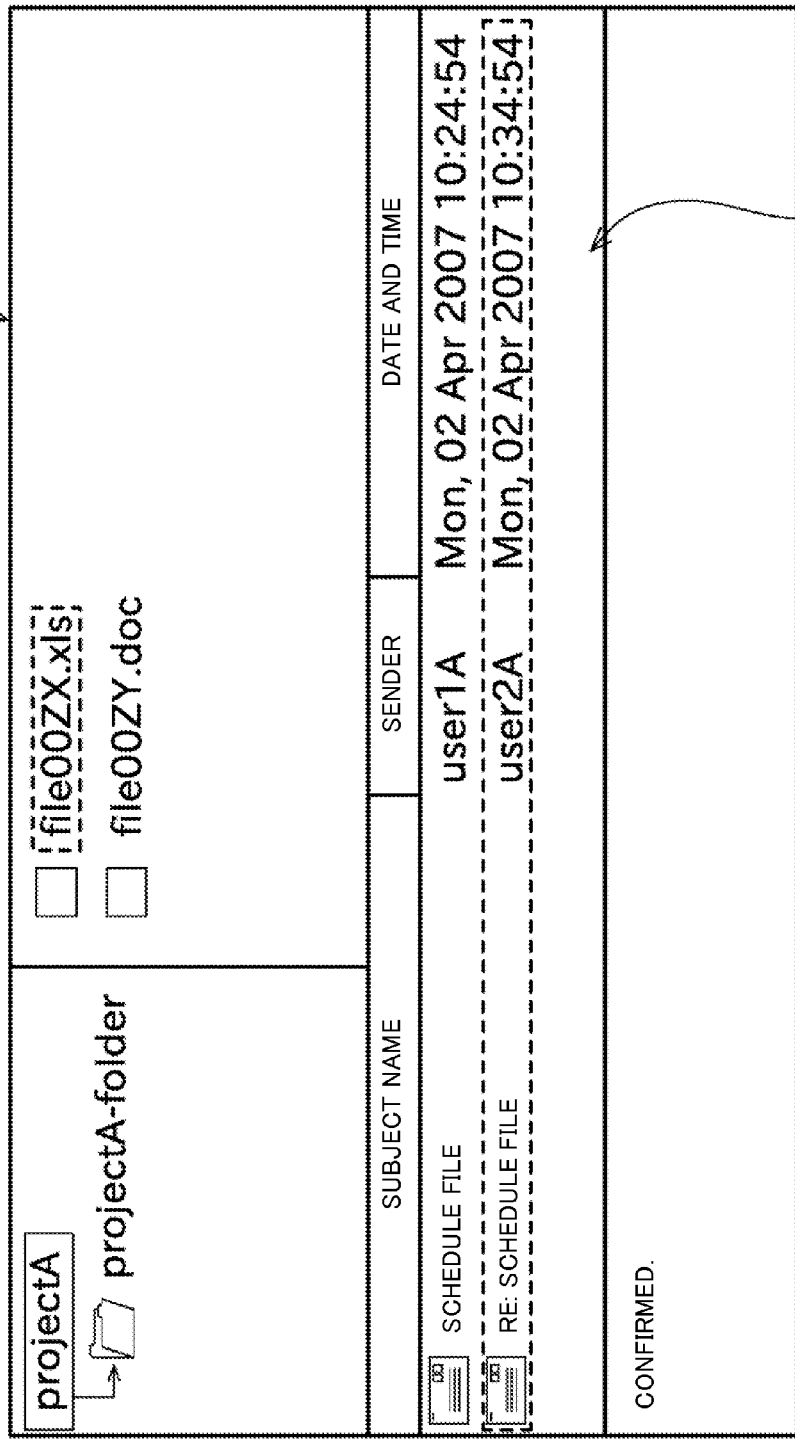
FIG. 13 is an explanation diagram of an example in which the message is displayed by using the client software.

FIG. 13 illustrates a display screen image of the client software of the client terminal 3A. As illustrated in FIG. 13, when "file00ZX.xls" is selected in the upper pane 151, two messages of the message thread associated with the shared file "file00ZX.xls" are displayed on the middle pane 152. FIG. 13 illustrates a state in which the message with the subject name "Re: schedule file" has been selected from the two messages, and the content of the body text of the message, "confirmed," is displayed on the lower pane 153.

As described above, the relay communication system including, as the constituent element, the relay server R of the present preferred embodiment can share the resource over the LAN and exchange the messages in association with the resource. Thus, the sharing of the resource and the exchanging of the messages regarding the sharing can be uniquely and integrally performed, thereby saving the user of the trouble of information management.

Figure 14:
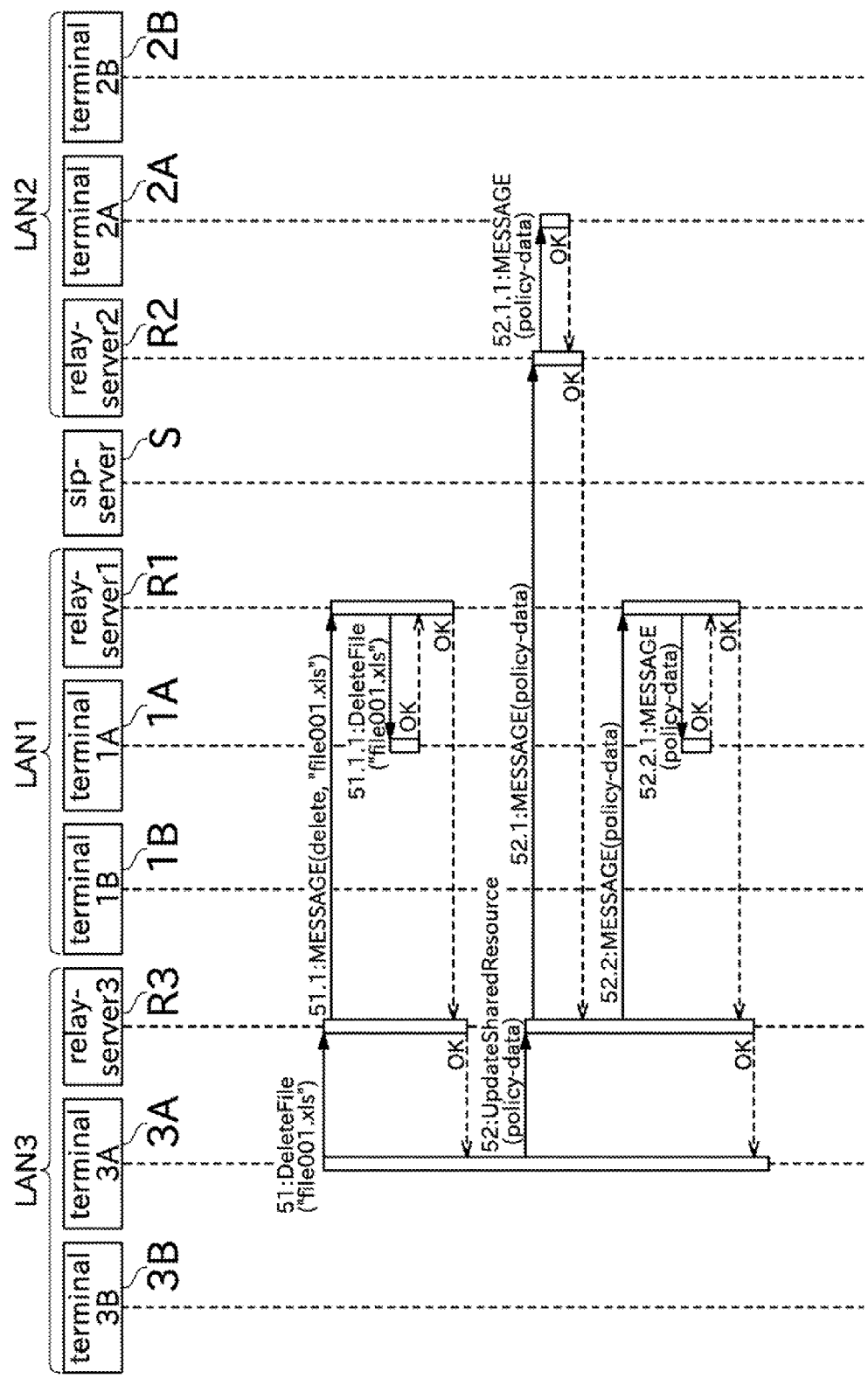
FIG. 14 is a sequence chart illustrating a communication process performed when the shared resource held by the client terminal is indirectly deleted by a client terminal of another LAN.

With reference to FIG. 14, a description will be made of an operation in which the client terminal 3A is operated to indirectly delete the resource ("file001.xls") held by the client terminal 1A connected to the LAN 1.

It is assumed that the user of the client terminal 3A gives an instruction to delete "file001.xls" displayed as the shared resource. Having received the instruction, the client terminal 3A transmits a file delete request (DeleteFile command) to the relay server R3 (sequence number 51 of FIG. 14).

When the file delete request is received, the relay server R3 specifies the owner client terminal T, which holds the file "file001.xls" to be deleted and can delete the file, and specifies the relay server R connected to the owner client terminal T. When specifying, the shared resource information 120 stored in the shared resource information database 506 and the relay group information 100 stored in the relay group information database 505 are referenced. In this case, it can be specified that the owner client terminal is the terminal 1A and that the relay server connected to the terminal 1A is the relay server R1 based on the shared resource information 120 in FIG. 7 and on the relay group information 100 in FIG. 6. Accordingly, the relay server R3 transmits the delete message to the relay server R1 and relays the instruction for file deletion (sequence number 51.1).

Having received the delete message from the relay server R3, the relay server R1 transmits the file delete request (DeleteFile command) to the client terminal 1A (sequence number 51.1.1). Having received the request, the client terminal 1A deletes the resource (file001.xls) to be deleted from the resource storage unit 603 and returns an OK response to the relay server R1. Having received the OK response, the relay server R1 returns an OK response to the relay server R3. Having received the response, the relay server R3 returns an OK response to the client terminal 3A.

An updating process of the shared resource information 120 is then performed. Specifically, the client terminal 3A, which has instructed deletion of the file, deletes the resource information 127 regarding the deleted resource (file001.xls) from the family resource information 125 of the shared resource information 120 stored in the shared resource information database 604. At this time, the message thread information 126 associated with the deleted resource (file001.xls) and the message information 129 included in the message thread information 126 are also deleted. In this case, the message of the message thread associated with the "file001.xls" is the message with the subject name "schedule file" and the message with the subject name "Re: schedule file." Accordingly, the message information 129 regarding these two messages is deleted.

The client terminal 3A then transmits a shared resource change request (UpdateSharedResource command) to the relay server R3 (sequence number 52). Having received the change request, the relay server R3 then transmits the policy-data message to the relay servers R1, R2, which are related to the changed shared resource information 120, and notifies of the changed shared resource information 120 (sequence number 52.1, 52.2).

Having received the message, each relay server R1, R2 stores the shared resource information 120 in its own shared resource information database 506, transmits the policy-data message to each user client terminal 1A, 2A, which is related to the shared resource 120, and notifies of the shared resource information 120 (sequence numbers 52.1.1, 52.2.1). Having received the message, each user client terminal 1A, 2A changes the shared resource information 120 stored in the shared resource information database 604 of its own device and returns an OK response to the relay servers R1, R2 of the transmission source. Having received the OK response, the relay servers R1, R2 returns an OK response to the relay server R3, and the relay server R3, which has received the OK response, returns an OK response to the client terminal 3A.

As described above, when the shared resource information 120 is changed, such change is notified to the related relay server R and client terminal T so that the shared resource information 120 will be immediately updated to the new shared resource information 120. When the change by which the shared resource is deleted is performed, the change by which the message information 129 regarding the shared resource is deleted is automatically performed in the shared resource information 120.

An example of the operation for deleting the file (resource) has been described in FIG. 13, however, the relaying operation of the relay server R3 is substantially the same even if the operation for updating the file held by the client terminal 1A to the file of different content is performed in the client terminal 3A. When the shared resource is not deleted, the message regarding the shared resource is not deleted.

As described above, when the operation instruction regarding the resource operable by the client terminal T connected to the other LAN is received from the client terminal T stored in the account information database 504, the relay server R connected to the LAN in this preferred embodiment is arranged to relay the operation instruction regarding the resource to the other relay server R based on the relay group information 100. For example, when the relay server R3 receives an instruction to delete the resource "file001.xls" operable by the client terminal 1A of the other LAN from the client terminal 3A, as illustrated in sequence number 51.1 of FIG. 14, the relay server R is arranged to relay the deletion instruction to the other relay server R1.

Moreover, it is arranged such that the message information 129 regarding the message to be transmitted by the client terminal T can be included in the shared resource information 120 stored in the shared resource information database 506 of the relay server R. It is also arranged such that when the message is transmitted by the client terminal T stored in the account information database 504, the relay server R relays the message information 129 regarding the message to the other relay server R based on the shared resource information 120 and the relay group information 100. For example, when the client terminal 1A transmits the message, as illustrated in sequence numbers 31.1 and 31.2 of FIG. 11, the relay server R1 relays the message information 129 regarding the message to the other relay servers R2 and R3.

Thus, the client terminals 1A, 2A, and 3A can form a virtual field, and the resource of the client terminal 1A can be shared. In addition, the messaging among the client terminals 1A, 2A, and 3A can be achieved.

In the present preferred embodiment, it is arranged such that the client terminal T, which shares the resource, can transmit a new message in response to the message. For example, one (the client terminal 2A) of the three client terminals, which share the resource "file001.xls" associated with the message of subject name "schedule file," transmits the message of subject name "Re: schedule file" by the addMessage METHOD of FIG. 11, in response to the above message. Then, when the new message is transmitted by the client terminal 2A, the relay server R2 relays the message information 129 regarding the new message to the other relay servers R1 and R3 based on the shared resource information 120 and the relay group information 100 (sequence numbers 41.1 and 41.2).

Thus, each client terminal T, which shares the resource over the LAN, can exchange user opinions or other information by sequentially adding the messages. Accordingly, dense, duplex communication can be achieved, thereby improving the efficiency of cooperative work.

In the present preferred embodiment, it is arranged such that the message information 129 can be registered in association with each shared resource information 120 in the shared resource information 120 stored in the shared resource information database 506 of the relay server R.

Thus, because the message information 129 is stored in the shared resource information database 506 of the relay server R in association with the shared resource, the resource and the message can be easily managed integrally.

Moreover, it is arranged such that in the relay server R of the present preferred embodiment, when the client terminal T, which shares the resource, deletes the resource, the shared resource information 120 stored in the shared resource information database 506 is updated, and the message information 129 associated with the deleted resource is deleted. For example, in the example of FIG. 14, when the resource "file001.xls" held by the client terminal 1A is deleted, the message information 129 related to the two messages (with the subject name "schedule file" and "Re: schedule file") of the message thread associated with the resource is deleted in the shared resource information 120 stored in the shared resource information database 506 in the relay servers R1, R2, and R3.

Thus, the shared resource and the message can be integrally managed more easily, thereby saving the trouble of information management.

Further, it is arranged such that when the client terminal T transmits the message in association with the resource, the destination (message publicizing terminal) can be specified from the client terminals that share the resource. Then, it is arranged such that, in the message information 129, the account of the message publicizing terminal can be included in the header 132 (To header) of the message content information 131.

Accordingly, because the publicizing/unpublicizing of the individual messages can be easily specified with respect to each client terminal T, flexible information management can be achieved.

The preferred embodiments of the present invention have been described above, but the above configuration may be modified as below.

The message may be deleted independently of the associated shared resource. Further, the message received from another client terminal T may be deleted separately in each client terminal T.

In the shared resource information 120 in FIG. 7, the message information 129 is associated with respect to each shared resource, however, as illustrated in FIG. 15, for example, the message information 129 may be associated with respect to all of the shared resource information 120. In the shared resource information 120 illustrated in FIG. 15, the message thread identifying information (for example, msg="msg:thread1") for specifying the message thread is described in a portion of the family resource information 125 instead of the resource information 127. Thus, one message thread can be registered in association with respect to all of the plurality of shared resources ("folderA", "file001.xls", and "file002.doc").

The client software executed by the client terminal T is not limited to be displayed on the screen illustrated in FIG. 12, but may be applied to other various user interfaces.

The content of the message is not limited to be in the publicly-known e-mail format illustrated in FIG. 8, but may be modified to be described in the shared resource information 120 in other formats such as an XML format.

The relay server R forming the relay group may be arbitrarily selected. Further, a plurality of relay groups may be formed to be stored in the relay group information database 505.

When performing the relay between different LANs as in the embodiment described above, the number of LANs merely needs to be in plurals and is not limited to four. Similar network other than the Internet may be used as the WAN.

A protocol other than the SIP may be used for the communication protocol between the external server S and each relay server R in the WAN and between the relay server R and the client terminals T in the LAN.

The external server S may be omitted, and communication may be directly carried out between the relay servers R. In particular, if a protocol other than the SIP is used between the relay servers R, the communication between the relay servers R may be directly controlled based on the protocol, and thus the external server S can be easily omitted. The external server S is not limited to one, and may dispersively function in plurals.

The WAN interface 502 of the relay server R may be omitted. In such a case, the connection with the Internet is performed by a router, and the relay server R may be connected to the router.

In the preferred embodiment described above, the client terminal T connected to the same LAN as the relay server R is preferably stored in the account information database 504 of the relay server R. However, it is not limited to the above preferred embodiment, and the client terminal T connected to the LAN different from its own device may be stored in the account information database 504. Furthermore, the relay server R and the client terminal T registered in the account information database 504 of the relay server R may have any relationship, as long as they can communicate with each other through the network.

A plurality of relay servers R may be connected to the same LAN. For example, it may be arranged such that three relay servers R are provided in the same LAN, where some client terminals T in the LAN are stored in the account information database 504 of the first relay server R and where some of the other client terminals T are stored in the account information database 504 of the second relay server R. In this case, the three relay servers R communicate through the LAN, and the relay is completed within one LAN.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server connected to a first LAN and arranged to communicate via a WAN with another relay server connected to a second LAN, the relay server comprising:
   an account information registering unit arranged to store account information about a client terminal connected to the first LAN;
   a relay group information registering unit arranged to store relay group information including information about the relay server and the another relay server and account information about a client terminal connected to each of the relay server and the another relay server via the first and second LANs, respectively;
   a shared resource information registering unit arranged to store shared resource information including:
      the name of a file or a folder defining a resource;
      information about an owner client terminal which is a client terminal capable of operating the resource;
      information about resource sharing client terminals that share the resource; and
      message information to be transmitted from one of the resource sharing client terminals, the message information being related to the resource;
   an operation instruction relay processing unit arranged to, when accepting an operation instruction of a resource from one of the resource sharing client terminals, specify the owner client terminal based on the shared resource information, specify a relay server connected to the specified owner client terminal based on the relay group information, and relay the operation instruction to the specified relay server; and
   a shared resource information relay processing unit arranged to, when accepting the message information to be transmitted from the one of the resource sharing client terminals, store the message information and information about the one of the resource sharing client terminals which has transmitted the message information in the shared resource information, specify at least another relay server connected to at least another one of the resource sharing client terminals based on the relay group information, and relay the message information to the specified relay server.

2. The relay server according to claim 1, wherein:
   the relay server is arranged to receive new message information from the one of the resource sharing client terminals in response to the message information transmitted by the one of the resource sharing client terminals; and
   when the new message information transmitted by the one of the resource sharing client terminals is received by the relay server, the new message information is relayed by the relay server to the at least another relay server based on the shared resource information and the relay group information.

3. The relay server according to claim 1, wherein:
   the relay server is arranged to receive new message information from the one of the resource sharing client terminals in response to the message information transmitted by the one of the resource sharing client terminals; and
   when the new message information transmitted by the one of the shared client terminals is received by the relay server, the new message information is relayed by the relay server to the at least another relay server based on the shared resource information and the relay group information; and
   the new message information is registered in association with the resource in the shared resource information stored in the shared resource information registering unit.

4. The relay server according to claim 1, wherein:
   when the relay server receives information that one of the resource sharing client terminals has deleted a resource:
      the shared resource information stored in the shared resource information registering unit is updated; and
      the message information associated with the deleted resource is deleted.

5. The relay server according to claim 1, wherein:
   the relay server is arranged to receive new message information from the one of the resource sharing client terminals in response to the message information transmitted by the one of the resource sharing client terminals;
   when the new message information transmitted by the one of the resource sharing client terminals is received by the relay server, the new message information is relayed by relay server to the at least another relay server based on the shared resource information and the relay group information; and
   the new message information is registered in association with the resource in the shared resource information stored in the shared resource information registering unit; and
   when the relay server receives information that one of the resource sharing client terminals has deleted a resource:
      the shared resource information stored in the shared resource information registering unit is updated; and
      the message information associated with the deleted resource is deleted.

6. The relay server according to claim 1, wherein, when the relay server receives the message information transmitted by the one of the resource sharing client terminals:
   the relay server is arranged to receive information about a message publicizing terminal specified by the one of the resource sharing client terminals; and
   account information about the message publicizing terminal is included in the message information.

7. The relay server according to claim 1, wherein:
   the relay server is arranged to receive new message information from the one of the resource sharing client terminals in response to the message information transmitted by the one of the resource sharing client terminals;
   when the new message information transmitted by the one of the resource sharing client terminals is received by the relay server, the new message information is relayed by the relay server to the at least another relay server based on the shared resource information and the relay group information; and the new message information is registered in association with the resource in the shared resource information stored in the shared resource information registering unit; and when the relay server receives the message information transmitted by the one of the resource sharing client terminals:
the relay server is arranged to receive information about a message publicizing terminal specified by the one of the resource sharing client terminals; and
account information about the message publicizing terminal is included in the message information.

8. The relay server according to claim 1, wherein:
when the relay server receives the message information transmitted by the one of the resource sharing client terminals:
the relay server is arranged to receive information about a message publicizing terminal specified by the one of the resource sharing client terminals; and
account information about the message publicizing terminal is included in the message information.

9. The relay server according to claim 1, wherein:
the relay server is arranged to receive new message information from the one of the resource sharing client terminals in response to the message information transmitted by the one of the resource sharing client terminals;
when the new message information transmitted by the one of the resource sharing client terminals is received by the relay server, the new message information is relayed by the relay server to at least another relay server based on the shared resource information and the relay group information; and
the new message information is registered in association with the resource in the shared resource information stored in the shared resource information registering unit; and
when the relay server receives the message information transmitted by the one of the resource sharing client terminals:
the relay server is arranged to receive information about a message publicizing terminal specified by the one of the resource sharing client terminals; and
account information about the message publicizing terminal is included in the message information.

10. The relay server according to claim 1, wherein:
when the relay server receives information that one of the resource sharing client terminals has deleted a resource:
the shared resource information stored in the shared resource information registering unit is updated; and
the message information associated with the deleted resource is also deleted; and
when the relay server receives the message information transmitted by the one of the resource sharing client terminals:
the relay server is arranged to receive information about a message publicizing terminal specified by the one of the resource sharing client terminals; and
account information about the message publicizing terminal is included in the message information.

11. The relay server according to claim 1, wherein:
the relay server is arranged to receive new message information from the one of the resource sharing client terminals in response to the message information transmitted by the one of the resource sharing client terminals; and
when the new message information transmitted by the one of the resource sharing client terminals is received by the relay server, the new message information is relayed by the relay server to the at least another relay server based on the shared resource information and the relay group information; and
the new message information is registered in association with the resource in the shared resource information stored in the shared resource information registering unit;
when the relay server receives information that one of the resource sharing client terminals has deleted a resource:
the shared resource information stored in the shared resource information registering unit is updated; and
the message information associated with the deleted resource is also deleted; and
when the relay server receives the message information transmitted by the one of the resource sharing client terminals:
the relay server is arranged to receive information about a message publicizing terminal specified by the one of the resource sharing client terminals; and
account information about the message publicizing terminal is included in the message information.

12. A relay communication system comprising a plurality of relay servers, wherein
each relay server is connected to a LAN and arranged to communicate via a WAN with another relay server connected to another LAN, each relay server includes:
an account information registering unit arranged to store account information about a client terminal connected to the LAN;
a relay group information registering unit arranged to store relay group information including information about the relay server and the another relay server and account information about a client terminal connected to each of the relay server and the another relay server via the LAN and the another LAN, respectively;
a shared resource information registering unit arranged to store shared resource information including:
the name of a file or a folder defining a resource;
information about an owner client terminal which is a client terminal capable of operating the resource;
information about resource sharing client terminals that share the resource;
message information to be transmitted from one of the resource sharing client terminals, the message information being related to the resource;
an operation instruction relay processing unit arranged to, when accepting an operation instruction of a resource from one of the resource sharing client terminals, specify the owner client terminal based on the shared resource information, specify a relay server connected to the specified owner client terminal based on the relay group information, and relay the operation instruction to the specified relay server; and
a shared resource information relay processing unit arranged to, when accepting the message information to be transmitted from the one of the resource sharing client terminals, store the message information and information about the one of the resource sharing client terminals which has transmitted the message information in the shared resource information, specify at least another relay server connected to the at least another one of the resource sharing client terminals based on the relay group information, and relay the message information to the specified relay server.

* * * * *